United States Patent [19]

Kawabe et al.

[11] Patent Number: 4,840,389
[45] Date of Patent: Jun. 20, 1989

[54] VEHICLE STEER ANGLE CONTROL SYSTEM BASED ON MATHEMATICAL MODEL

[75] Inventors: Taketoshi Kawabe, Tokyo; Ken Ito, Yokohama, both of Japan

[73] Assignee: Nissan Motor Co., Ltd., Japan

[21] Appl. No.: 106,444

[22] Filed: Oct. 9, 1987

[30] Foreign Application Priority Data

Oct. 13, 1986 [JP] Japan .................... 61-241430

[51] Int. Cl.⁴ .............................. B62D 6/02
[52] U.S. Cl. ................................ 280/91; 364/424.05; 180/140
[58] Field of Search ............... 280/91; 180/140, 141, 180/142; 364/424, 424.05

[56] References Cited

U.S. PATENT DOCUMENTS

| | | | |
|---|---|---|---|
| 3,866,706 | 2/1975 | Lincke et al. | 180/142 |
| 4,418,780 | 12/1983 | Ito et al. | 180/142 |
| 4,441,572 | 4/1984 | Ito et al. | 180/140 |
| 4,679,808 | 7/1987 | Ito et al. | 280/91 |
| 4,679,809 | 7/1987 | Ito et al. | 280/91 |
| 4,690,431 | 9/1987 | Ito et al. | 280/91 |
| 4,706,771 | 11/1987 | Kawabe et al. | 180/142 |
| 4,706,979 | 11/1987 | Kawabe et al. | 280/91 |
| 4,718,685 | 1/1988 | Kawabe et al. | 280/91 |

FOREIGN PATENT DOCUMENTS

163770 8/1985 Japan ...................... 280/91

*Primary Examiner*—Charles A. Marmor
*Assistant Examiner*—Karin Tyson
*Attorney, Agent, or Firm*—Leydig, Voit & Mayer

[57] ABSTRACT

A steer angle control system for a controlled vehicle comprises sensors for sensing the steering wheel angle and the vehicle speed of the controlled vehicle, a processor such as a microcomputer, and an actuator for steering the front and/or rear wheels of the controlled vehicle in response to a control signal produced by the processor. The processor includes a reference behavior determining section for determining the value of a reference output motion variable corresponding to the sensed steering wheel angle and vehicle speed by solving a reference mathematical model representing desired vehicle motion characteristics, a vehicle behavior monitoring section for determining a value of the plant output motion variable which is a linear combination of a yawing motion variable, such as a yaw rate of the controlled vehicle, and a side translational motion variable, such as a lateral acceleration of the controlled vehicle, and a controller section for producing the control signal representing a target steer angle so as to reduce an error between the reference variable and the plant variable.

16 Claims, 8 Drawing Sheets

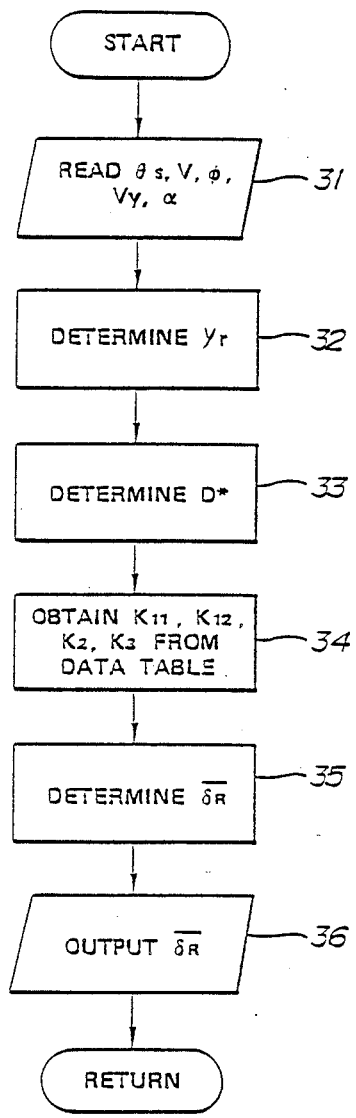

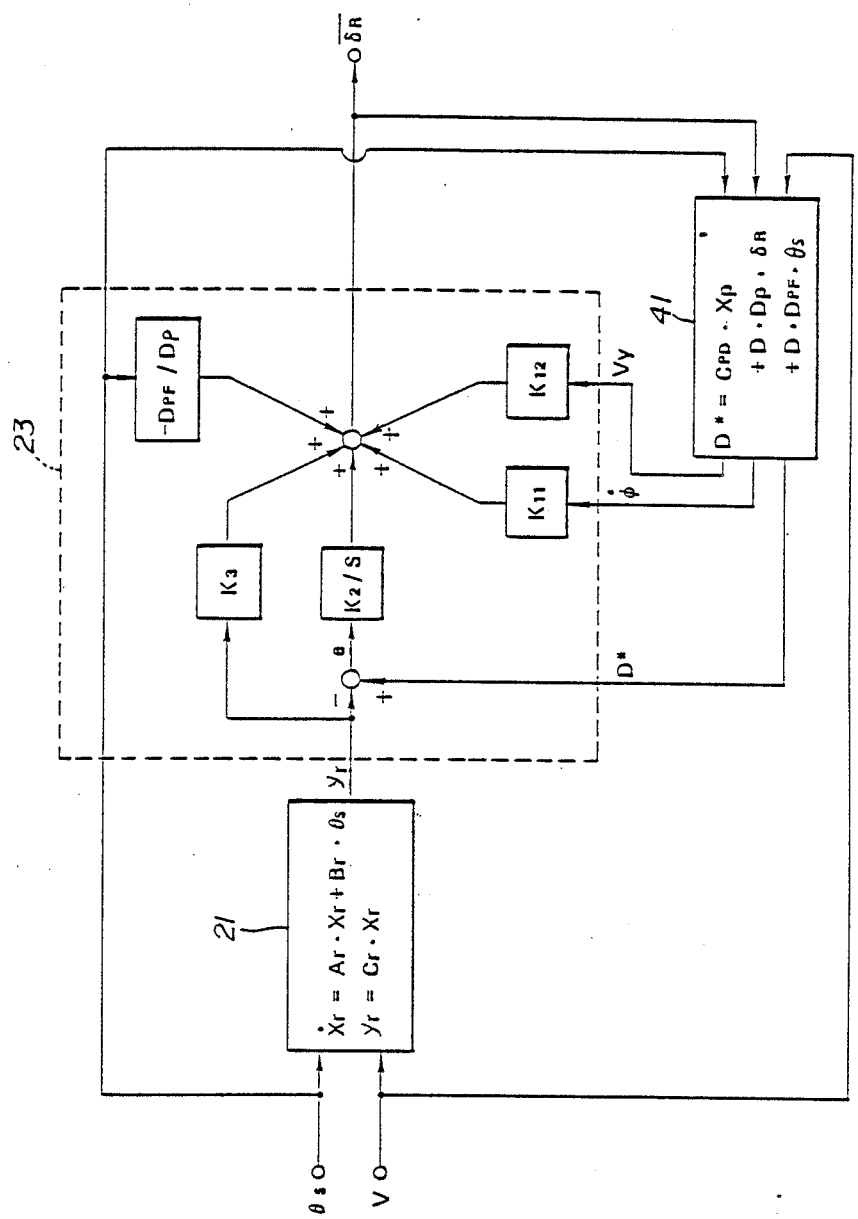

VEHICLE STEER ANGLE CONTROL SYSTEM BASED ON MATHEMATICAL MODEL

CROSS REFERENCE TO RELATED APPLICATIONS

The following U.S. patent applications relate to subject matter similar to that of the present application. (1) Ser. No. 755,352 (U.S. Pat. No. 4,773,012), (2) Ser. No. 773,621 (U.S. Pat. No. 4,690,431), (3) Ser. No. 773,622 now abandoned, (4) Ser. No. 773,650 (U.S. Pat. No. 4,679,809), (5) Ser. No. 823,324 (U.S. Pat. No. 4,706,771), (6) Ser. No. 837,170 (U.S. Pat. No. 4,679,808), (7) Ser. No. 850,665 (U.S. Pat. No. 4,767,588), (8) Ser. No. 883,719 (U.S. Pat. No. 4,706,979), (9) Ser. No. 939,107 (U.S. Pat. No. 4,718,685), (10) Ser. No. 948,155.

BACKGROUND OF THE INVENTION

The present invention relates to a steer angle control system for providing a wheeled vehicle with desired steering response characteristics.

One conventional steer angle control system is disclosed in a Japanese patent provisional publication No. 61-175180 corresponding to the abovementioned U.S. application No. 823,324 (U.S. Pat. No. 4,706,771).

This control system is provided with first and second reference mathematical models representing desired vehicles having desired dynamic characteristics and first and second actual mathematical models representing an actual vehicle to be controlled. In response to sensed values of the steering wheel angle and the speed of the controlled vehicle, this control system determines a desired value of a yawing motion variable by using the first reference model and separately determines a desired value of a side slipping motion variable by using the second reference model. Then, the control system determines a first optimum steer angle value by inputting the desired value of the yawing motion variable into the first actual model and a second optimum steer angle value by inputting the desired value of the side motion variable into the second actual model. Finally, the control system determines a weighted average of the first and second optimum angle values and steers the wheels of the controlled vehicle in accordance with the weighted average. In this way, this control system can provide an adequate steer angle control by adjusting the weights of the yawing motion and side slipping motion.

However, this conventional control system must solve the two reference mathematical models and the two actual mathematical models with a microcomputer mounted on the controlled vehicle. Therefore, the time required to complete each control cycle is so long that it is very difficult to implement an accurate control.

SUMMARY OF THE INVENTION

It is an object of the present invention to provide a vehicle steer angle control system capable of controlling yawing motion and side translational motion of the vehicle adequately in an accurate and precise manner.

According to the present invention, a steer angle control system for a controlled vehicle having at least one steerable first wheel comprises sensor means, reference behavior determining means, vehicle behavior monitoring means, controller means, and actuator means. The sensor means is for sensing conditions of the controlled vehicle and comprises means for sensing the steering wheel angle of the controlled vehicle and providing a sensed steering wheel angle and means for sensing the speed of the controlled vehicle and providing a sensed vehicle speed. The reference behavior determining means is connected with the steering wheel angle sensing means and the vehicle speed sensing means for determining the value of a reference output motion variable of a predetermining reference mathematical model, corresponding to the sensed steering wheel angle and vehicle speed by solving the reference mathematical model. The vehicle behavior monitoring means is for determining a value of the plant output motion variable which is a linear combination of a yawing motion variable of the controlled vehicle and a side motion variable of the controlled vehicle. The controller means is connected with the reference behavior determining means and the vehicle behavior monitoring means for producing a control signal representing a target first wheel steer angle of the controlled vehicle so as to reduce the deviation of the plant output motion variable from the reference output motion variable. The actator means is connected with the controller means for varying an actual first wheel steer angle of the controlled vehicle in accordance with the control signal.

BRIEF DESCRIPTION OF THE DRAWINGS

FIG. 4 is a flow chart showing a control program used in the first embodiment.

FIG. 6 is a block diagram showing functions of the processor of a secod embodiment of the present invention.

DETAILED DESCRIPTION OF THE INVENTION

Figure 1:
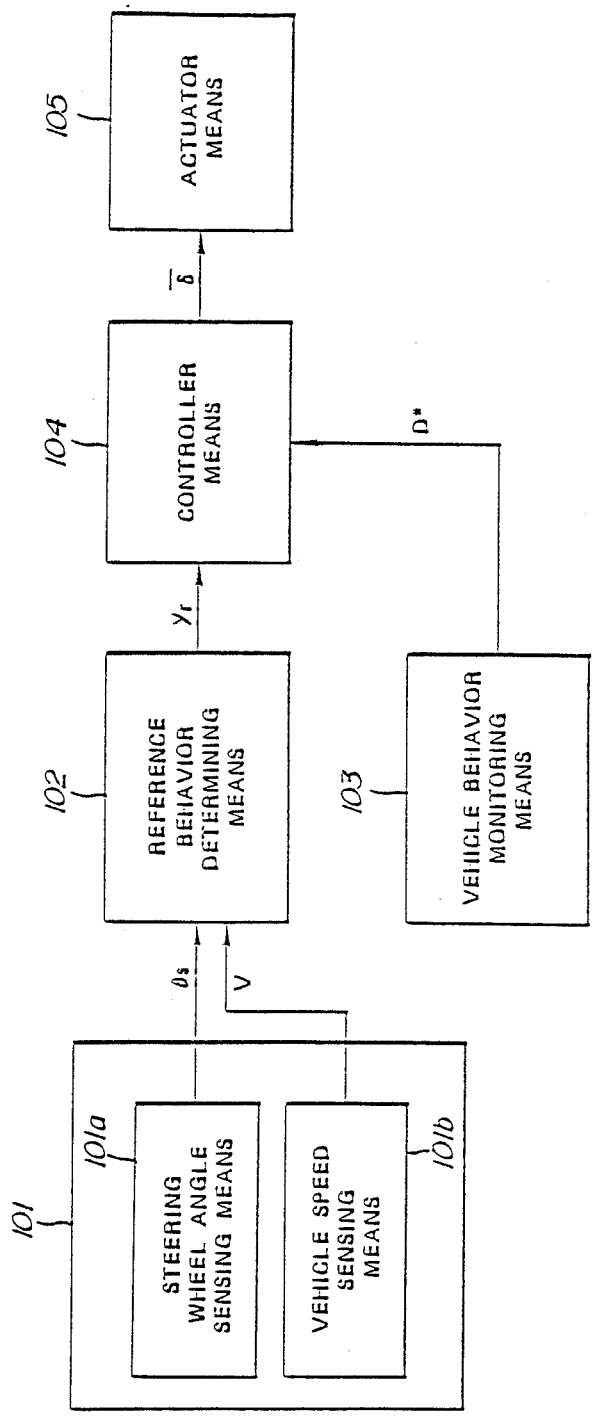
FIG. 1 is a schematic block diagram showing a steer angle control system according to the present invention.

FIG. 1 schematically shows a control system of the present invention, which includes a sensor means 101 having at least a steering wheel angle sensing means 101a and a vehicle speed sensing means 102b, a reference behavior determining means 102 for determining a value of a reference output motion variable $y_r$, a vehicle behavior monitoring means 103 for determining a value of a plant output motion variable D*, a controller means 104 for determining a target front or rear wheel steer angle $\bar{\delta}$, and an actuator means for actually steering the controlled vehicle.

Figure 2:
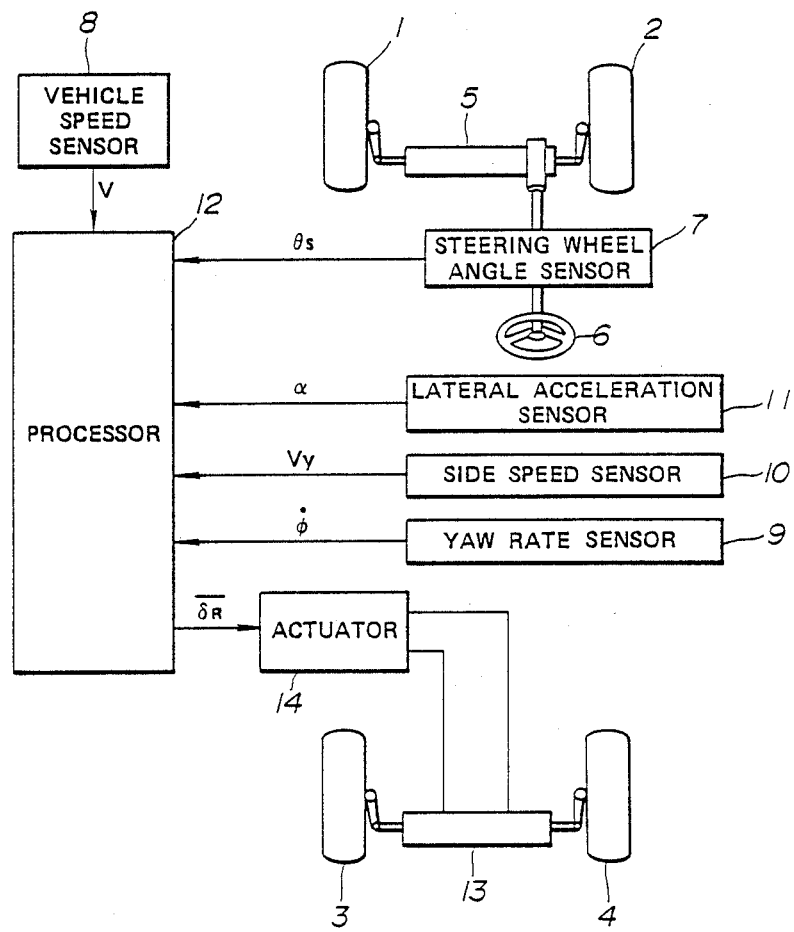
FIG. 2 is a schematic view showing a steer angle control system of a first embodiment of the present invention.
Figure 3:
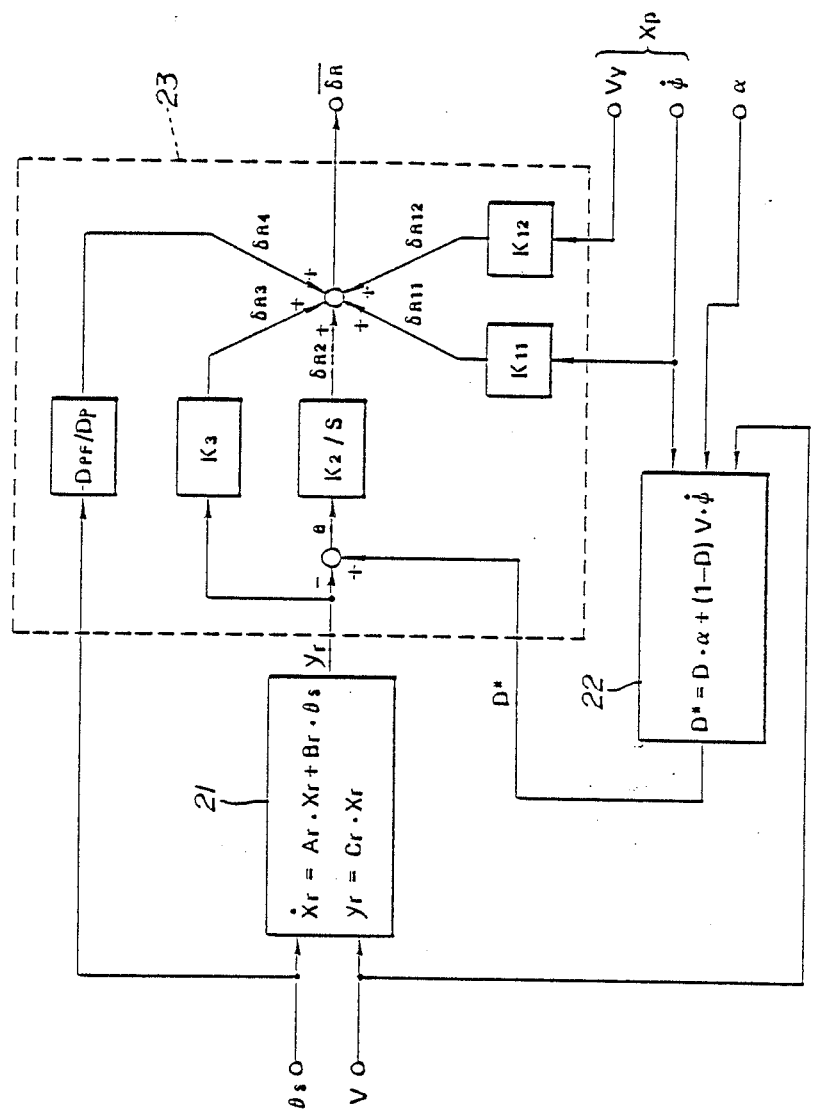
FIG. 3 is a block diagram showing functions of a processor shown in FIG. 2.

A first embodiment of the present invention is shown in FIGS. 2–4.

A steer angle control system of FIG. 2 is mounted on a controlled vehicle (i.e. a plant) which has left and right front wheels 1 and 2, and left and right rear wheels 3 and 4. In this embodiment, the front wheels 1 and 2 are steered through a front steering device 5 of a conventional mechanical linkage type so that a front wheel steer angle of the front wheels 1 and 2 is varied in accordance with an angular displacement of a steering wheel 6.

The steer angle control system of FIG. 2 includes a steering wheel angle sensor 7 for sensing a steering wheel angle $\theta_S$ of the steering wheel 6 of the controlled vehicle and a vehicle speed sensor 8 for sensing a vehicle speed V of the controlled vehicle.

The steer angle control system of this embodiment further includes a yaw rate sensor 9, a side speed sensor 10 and a lateral acceleration sensor 11. The yaw rate sensor 9 is arranged to sense the yaw rate $\dot{\phi}$ (dotted phi) of the controlled vehicle by using a gyro. The side speed sensor 10 is arranged to sense the side speed $V_y$ of the controlled vehicle by using a ground speed meter or other devices. The lateral acceleration sensor 11 is arranged to sense the lateral acceleration $\alpha$(alpha) of the controlled vehicle by using an accelerometer.

These sensors 7–11 are connected to a processor 12 which is in the form of a microcomputer in this embodiment. The sensed values of $\theta_S$, V, $\dot{\phi}$, $V_y$ and $\alpha$ are inputted into the processor 12. The processor 12 performs the functions of the reference behavior determining means 102, vehicle behavior monitoring means 103 and controller means 103, and produces a control signal representing a target first wheel steer angle value $\bar{\delta}$ (dashed delta) which is, in this embodiment, a target value of a rear wheel steer angle $\bar{\delta}_R$.

The controlled vehicle of this embodiment has a hydraulic rear wheel steering device 13 for steering the rear wheels 3 and 4. The control signal $\bar{\delta}_R$ of the processor 12 is sent to an actuator 14, which controls a working fluid pressure supplied to the hydraulic device 13 in accordance with the control signal. Therefore, the rear wheels 3 and 4 are steered so that the actual rear wheel steer angle is held equal to the target steer angle value $\bar{\delta}_R$ represented by the control signal. In this embodiment, the actuator 14 and hydraulic device 13 comprise the actuator means 105 of FIG. 1. The hydraulic device 13 and actuator 14 are explained more in detail in each of Japanese patent provisional publication No. 61-67665, U.S. Pat. No. 4,679,809, U.S. patent application Ser. No. 024,862 and German Offelengungsschrift 35 32 246. The disclosures of these documents are herein incorporated by reference.

FIG. 3 shows functional blocks of the processor 12 of the first embodiment. The processor 12 of the first embodiment includes a first section 21 serving as the reference behavior determining means 102, a second section 22 serving as the vehicle behavior monitoring means 103, and a third section 23 serving as the controller means 104.

The first section 21 has a reference model having a transfer function of a first order lag, expressed by the following equation (1).

$$\frac{y_r(s)}{\theta_s(s)} = \frac{G(V)}{1 + \tau \cdot s} \quad (1)$$

In this equation, G(V) is a gain which is a function of the vehicle speed V, $\tau$(tau) is predetermined time constant giving the reference model a desired characteristic, s is a Laplace operator (a differential operator), and $y_r$ is a reference composite motion variable which is a predetermined motion variable of the reference model relating to the yawing motion and the side translational motion.

By using an equation of motion, this reference model can be expressed as follows:

$$\dot{X}_r = A_r X_r + B_r \theta_s \quad (2)$$

$$Y_r = C_r X_r \quad (3)$$

In these equations, $A_r = -1/\tau$, $B_r = G(V)/\tau$ and $C_r = 1$. The Equation (2) is a state equation and equation (3) is an output equation. The variable $X_r$ is a state variable expressing a combination of a state quantity relating to the yawing motion and a state quantity relating to the side motion.

The first section 21 determines a value of the reference composite motion variable $Y_r$ corresponding to the sensed steering wheel angle $\theta_s$ and the sensed vehicle speed V by performing mathematical operations expressed by following equations (4) and (5) obtained from the equations (2) and (3).

$$y_r = \int \dot{y}_r \, dt \quad (4)$$

$$\dot{y}_r = \frac{1}{\tau}(-y_r + G(V) \cdot \theta_s) \quad (5)$$

The second section 22 receives the sensed value of the vehicle speed V, yaw rate $\dot{\phi}$ and lateral acceleration $\alpha$, and calcualtes a value of a plant composite motion variable D* of the controlled vehicle (i.e. the plant) by using the following equation (6).

$$D^* = D \cdot \alpha + (1-D) V \cdot \dot{\phi} \quad (6)$$

In equation (6), D is a predetermined weight factor which is a constant greater than zero and smaller than 1. The plant composite motion variable D* is a linear combination of a component representing the yawing motion of the controlled vehicle and a component representing the side motion of the controlled vehicle. The second section 22 gives the weight factor D to the lateral acceleration $\alpha$ and the weight (1-D) to the yaw rate $\dot{\phi}$. Therefore by choosing an appropriate value of the constant D, the control system can provide the controlled vehicle with dynamic characteristics such that proper importance is attached to the yawing motion or the side motion. Furthermore, it is possible to improve both the characteristic of the yawing motion at low vehicle speeds, and the characteristic of the side motion at high vehicle speeds by varying the weight factor D as a function of the vehicle speed V so that the weight factor D approaches zero when the vehicle speed V is low and D approaches one when V is high.

In the second term of the right hand member of equation (6), the yaw rate $\dot{\phi}$ is multiplied by the vehicle speed V in order to equalize the dimensions of the first and second terms on the basis of the relationship between the lateral acceleration $\alpha$ and yaw rate $\dot{\phi}$ as expressed by the following equation.

$$\alpha = V \cdot \dot{\phi} + \dot{V}_y \quad (7)$$

where $\dot{V}_y$ is a side translational acceleration given by $$\dot{V}_y = \frac{d}{dt} V_y.$$

The third section 23 shown in FIG. 3 is designed to perform a model following control to cause the plant composite variable D* which is an output of the controlled vehicle (plant), to follow up the desired value $y_r$ which is an output of the reference model. For this purpose, the third section 23 functions as a controller implementing an output feedback, a state feedback and a feedforward compensation by using optimum control gains $K_{11}$, $K_{12}$, $K_2$ and $K_3$ determined on the basis of an optimal regulator theory, as explained later.

The output feedback is performed with a basic quantity $\delta_{R2}$, which is determined by the third section 23 so as to make the value of the plant composite motion variable D* equal to the value of the reference composite motion variable $y_r$. First, the third section 23 determines an error e between the plant composite variable D* and the reference composite variable $y_r$. Then, the third section 23 determines the basic quantity $\delta_{R2}$ by integrating the error and multiplying the integral of the error by a gain $K_2$.

The state feedback to improve the stability of the control is performed with first and second state feedback compensation quantities $\delta_{R11}$ and $\delta_{R12}$. The third section 23 determines the first compensation quantity $\delta_{R11}$ by multiplying the actual yaw rate, $\phi$ sensed by the yaw rate sensor 9, by a gain $K_{11}$ and the second compensation quantity $\delta_{R12}$ by multiplying the actual side speed $V_y$, sensed by the side speed sensor 10, by a gain $K_{12}$. The third section 23 further determines a feedforward compensation quantity $\delta_{R3}$ by multiplying the desired quantity $y_r$ by a gain $K_3$ to improve the speed of response during transient state motion. Furthermore, the third section 23 determines a compensation quantity $\delta_{R4}$ by amplifying the sensed steering wheel angle $\theta_s$ by a gain $-D_{PF}/D_P$. This compensation quantity $\delta_{R4}$ eliminates direct influence of the steering input on the lateral acceleration.

Then, the third section 23 determines a target rear wheel steer angle value $\overline{\delta_R}$ by adding the compensation quantities $\delta_{R11}$, $\delta_{R12}$, $\delta_{R3}$, and $\delta_{R4}$ to the basic quantity $\delta_{R2}$ according to the following equation (8), and outputs the target value $\overline{\delta_R}$ as a control signal.

$$\overline{\delta_R} = \delta_{R2} + \delta_{R11} + \delta_{R12} + \delta_{R3} + \delta_{R4} \quad (8)$$

In this embodiment, the gains $K_{11}$, $K_{12}$, $K_2$, $K_3$ and $-D_{PF}/D_P$ are determined in the following manner.

When the controlled vehicle is treated as having two degrees of freedom, one relating to the yaw rate $\phi$ and one relating to the side translational speed $V_y$, then we can obtain the following state equation and output equation.

$$X_P = A_p \cdot X_p + B_p \cdot \delta_R + B_{PF} \cdot \theta_S \quad (9)$$
$$D^* = C_{PD} \cdot X_P + D \cdot D_P \cdot \delta_R + D \cdot D_{PF} \cdot \theta_S \quad (10)$$
where $X_p = [\phi \ V_y]^T$ $$A_p = \begin{pmatrix} a_{11}(V) & a_{12}(V) \\ a_{21}(V) & a_{22}(V) \end{pmatrix}$$

$B_p = [b_{12}\ b_{22}]^T$, $B_{PF} = [b_{11}\ b_{21}]^T$
$C_{PD} = [D \cdot a_{21}(V) + VD \cdot a_{22}(V)]$
$D_{PF} = b_{21}$, $D_p = b_{22}$
$a_{11}(V) = -2(L_F^2 \cdot eK_F + L_R^2 \cdot K_R)/I_Z \cdot V$
$a_{12}(V) = -2(L_F \cdot eK_F - L_R \cdot K_R)/I_Z \cdot V$
$a_{21}(V) = -2(L_F \cdot eK_F - L_R \cdot K_R)/M \cdot V - V$
$a_{22}(V) = -2(eK_F + K_R)/M \cdot V$
$b_{11} = 2L_F \cdot eK_F/I_Z \cdot N$ -continued
$b_{12} = -2L_F \cdot K_R/I_Z$
$b_{21} = 2eK_F/M \cdot N$
$b_{22} = 2K_R/M$ In these equations, $L_F$, $L_R$, $eK_F$, $K_R$, $M$, $I_Z$ and $N$ are vehicle parameters of the controlled vehicle.

$L_F$ = the distance between the front axle and the center of gravity of the controlled vehicle.

$L_R$ = the distance between the rear axle and the center of gravity of the controlled vehicle.

$eK_F$ = front wheel equivalent cornering power of the controlled vehicle.

$K_R$ = rear wheel cornering power of the controlled vehicle.

M = the vehicle mass of the controlled vehicle.

$I_Z$ = the yawing moment of inertia of the controlled vehicle.

N = the steering gear ratio of the controlled vehicle. The actual rear wheel angle $\delta_R$ is kept equal to the target rear wheel angle value $\overline{\delta_R}$ by the action of the actuator 14 and the hydraulic device 13. Therefore, $\delta_R = \overline{\delta_R}$.

Equation (10) is obtained by substituting the following equation (11), expressing the lateral acceleration $\delta$, into the equation (6).

$$\alpha = [a_{21}(V) + V a_{22}(V)]X_p + b_{21} \cdot \theta_s + b_{22} \cdot \delta_R \quad (11)$$

The error between the reference variable $y_r$ and the plant variable D* is defined by:

$$e = D^* - Y_r \quad (12)$$

Therefore, it is possible to establish an expanded system encompassing the reference model and the plant (i.e. the controlled vehicle) by using equations (2) and (3) of the reference model, equations (9) and (10) of the plant, and the relationship (12) and treating the steering input as a step input ($\dot{\theta}_s = 0$). The following is a state equation of the expanded system.

$$\frac{d}{dt}\begin{pmatrix} \dot{X}_p \\ e \\ \dot{X}_r \end{pmatrix} = \begin{pmatrix} A_p & 0 & 0 \\ C_{PD} & 0 & -C_r \\ 0 & 0 & A_r \end{pmatrix}\begin{pmatrix} \dot{X}_p \\ e \\ \dot{X}_r \end{pmatrix} + \begin{pmatrix} B_p \\ D \cdot D_p \\ 0 \end{pmatrix}\dot{\delta}_R \quad (13)$$

The rear wheel steer angle $\delta_R$, which is a control input of this expanded system, is given by the following equation (14).

$$\delta_R = K_1 \cdot X_p + K_2 \int_o^t e\, dt + K_3 \cdot X_r - \frac{D_{PF}}{D_P}\theta_s \quad (14)$$

In this equation, $X_r = y_r$ because $C_r - 1$. This equation (14) is correspondent to the function of the third section 23.

The object of the control is to make the error e in the expanded system approach zero, but the magnitude of the rear wheel steer angle $\delta_R$ is limited. Therefore, an evaluation function (or a criterion function) J given by the following equation (15) is introduced to improve the convergence of the error e and and at the same time to decrease the rear wheel steer angle $\delta_R$.

$$J = \int_0^\infty (e^2 \cdot Q + \delta_R^2 \cdot R)dt \quad (15)$$

In the equation (15), Q and R are each a positive constant weighted in accordance with the vehicle parameters of the controlled vehicle and other parameters.

The optimum control gains $K_{11}$, $K_{12}$, $K_2$ and $K_3$ are, respectively, set equal to values of the coefficients $K_1(=[K_{11}K_{12}])$, $K_2$ and $K_3$ of equation (14) to minimize the evaluation function J. The values of these coefficients to minimize J can be determined by solving a Riccati equation about equation (13) on the basis of the optimal regulator theory (Japanese patent application No. 61-82359 discloses this process more in detail.).

In this embodiment, values of the gains $K_{11}$, $K_{12}$, $K_2$ and $K_3$ are determined by table lookup. Each of these gains is dependent on the vehicle speed V. Therefore, the range of the vehicle speed V is divided into small sections, and a value of each gain is preliminarily calculated for each section of the vehicle speed range. For example, the vehicle speed is divided at regular intervals of 5 km/h, and in the interval in which 80 km/h$\leq$V<85 km/h, each gain is calculated by regarding V as being V=82.5 km/h. The values of the gains for every vehicle speed section are stored in the form of a data table in a memory of the processor 12. Therefore, when the vehicle speed V is inputted, the third section 23 can immediately obtain values of the gains corresponding to the vehicle speed V from the data table.

The gain $-D_{PF}/D_P$ is determined from the above-mentioned vehicle parameters of the controlled vehicle because $D_{PF}=b_{21}=2eK_F/M\cdot N$ and $D_P=b_{22}=2K_R/M$.

The purpose of adding $-(D_{PF}/D_P)\theta_s$ to the right hand member of the equation (14) is to eliminate the term of $\theta_s$ from the right hand member of the equation (10) relating to the lateral acceleration. With this operation, the control system of this embodiment can prevent a large variation in an initial response of the lateral acceleration $\alpha$ and cause the plant variable $D^*$ to follow the reference variable $y_r$ in a satisfactory manner by removing direct influences of the steering input on the lateral acceleration.

FIG. 4 is a flowchart showing a program performed by the processor 12. The processor 12 performs an initialization when the ignition switch is turned on and the supply of power is started. Thereafter, the processor 12 repeats the program at regular time intervals of a length $\Delta t$.

At a first step 31, the processor 12 reads the sensed values of the steering wheel angle $\theta_s$, vehicle speed V, yaw rate $\dot{\phi}$, side speed $V_y$ and lateral acceleration $\alpha$ delivered from the sensors 7–11. At a next step 32, the processor 12 determines the desired value $y_r$ by performing operations of the equations (4) and (5).

At a step 33 following the step 32, the processor 12 determines a value of the plant variable $D^*$ by using the equation (6) and a value of D which is a predetermined constant (or a variable) as mentioned before. At a step 34, the processor 12 determines the optimum control gains $K_{11}$, $K_{12}$, $K_2$ and $K_3$ by looking up values corresponding to the current value of the vehicle speed V in the data table stored in the memory.

Then, the processor 12 determines the target rear wheel steer angle value $\overline{\delta_R}$ by using the equation (14) ($\overline{\delta_R}=\delta_R$) at a step 35, and outputs the thus-determined target angle value $\overline{\delta_R}$ as the control signal at a final step 36.

Figure 5A:
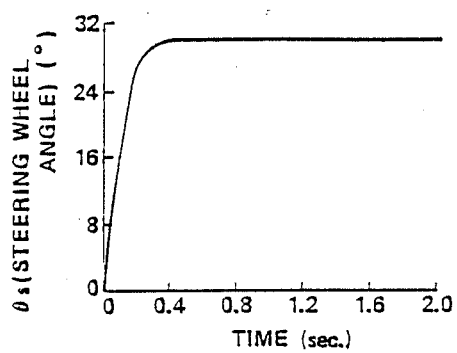
FIGS. 5A–5E are graphs showing the results of a computer simulation performed about the control system of the first embodiment.
Figure 5B:
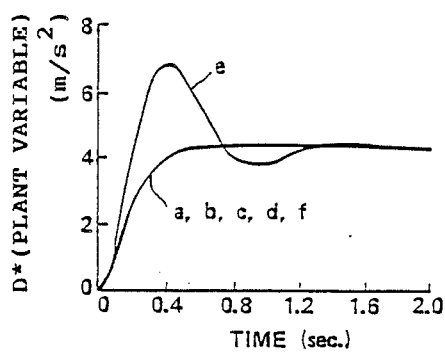
Figure 5C:
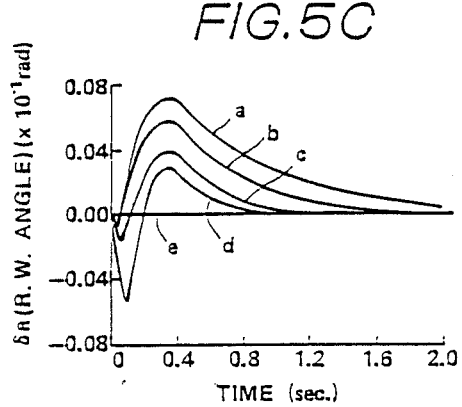
Figure 5D:
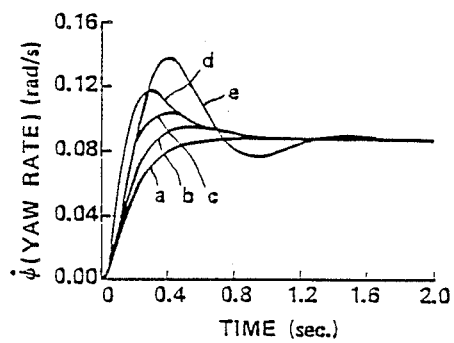
Figure 5E:
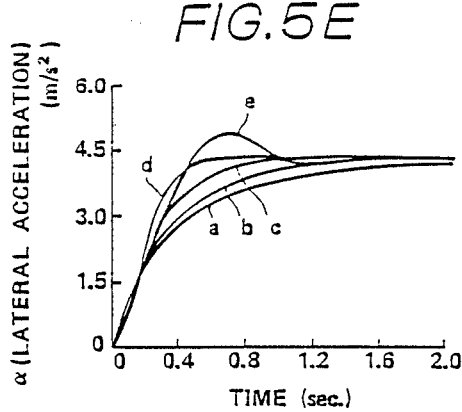

FIGS. 5A–5E show the results obtained by a high precision computer simulation performed on operations of the control system of this embodiment. In FIGS. 5B–5E, curves "a" show response characteristics resulting from a step input of the steering wheel angle $\theta_s$ shown in FIG. 5A when D=0. Other characteristic curves are obtained similarly, but D=$\frac{1}{3}$ in characteristic curves "b", D=$\frac{2}{3}$ in "c", and D=1 in "d". Curves "e" are characteristics of a conventional vehicle whose rear wheels are not steered. A curve "f" in FIG. 5B is a characteristic of the desired value $y_r$ outputted from the reference model.

As known from FIGS. 5A–5E, for any value of D, the control system of this embodiment can cause the plant variable $D^*$ to faithfully follow the reference variable $y_r$ and provide the responses of the yaw rate $\dot{\phi}$ and the latreal acceleration $\alpha$ which are more stable and nonoscillatory as compared with a conventional vehicle. Furthermore, this control system can choose desired dynamic characteristics by choosing an appropriate value for D.

The control system of this embodiment uses only one reference model so that the run time required to perform the program of this embodiment is shorter than that of the conventional device. Therefore, it is possible to sufficiently reduce the cycle time (i.e. $\Delta t$) of the program execution and to make the control more accurate and precise.

In the first embodiment, the actual motion variables of the controlled vehicle are sensed and fed back to the control system. Therefore, even if some of the actual vehicle parameters of the controlled vehicle deviate more or less from the values used for calculating the gains $K_{11}$, $K_{12}$, $K_2$ and $K_3$, the control system of this embodiment can absorb such deviations and always provide an adequate control performance.

Figure 7:
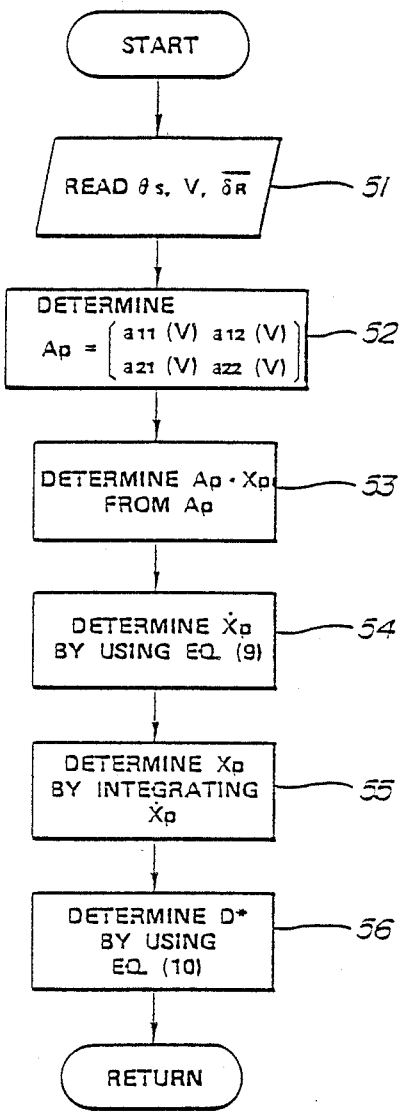
FIG. 7 is a flowchart showing a subprogram used in the second embodiment.

A second embodiment of the present invention is shown in FIGS. 6 and 7.

The steer angle control system of the second embodiment is also arranged as shown in FIG. 1 except that the system of the second embodiment does not include the yaw rate sensor 9, side speed sensor 10 or lateral acceleration sensor 11.

The processor 12 of the second embodiment performs functions shown in FIG. 6. The structure of FIG. 6 is different from the structure of the first embodiment shown in FIG. 3 only in a second section 41 which serves as the vehicle behavior monitoring means 103 for determining $D^*$. The second section 41 of the second embodiment is arranged to receive the sensed steering wheel angle $\theta_s$ from the sensor 7, the sensed vehicle speed V from the sensor 8, and the target rear wheel angle $\overline{\delta_R}$ from the third section 23. From these input data, the second section 41 estimates the yaw rate $\dot{\phi}$ and side speed $V_y$ of the controlled vehicle by using an actual vehicle model representing the controlled vehicle in terms of one or more equations of motion. In this embodiment, the second section 41 determines the estimated values of the yaw rate and side speed by using the above-mentioned equation (9). Then, the second section 41 determines the plant composite motion variable $D^*$ from the sensed steering wheel angle $\theta_s$ and the determined target rear wheel angle $\overline{\delta_R}$ as well as the estimated yaw rate $\dot{\phi}$ and estimated side speed $V_y$ by using the equation (10).

The processor 12 of the second embodiment performs the function of the second section 41 by executing a subprogram shown in FIG. 7.

At a step 51 of FIG. 7, the processor 12 reads the current values of the sensed steering wheel angle $\theta_s$, the sensed vehicle speed V and the target rear wheel angle $\overline{\delta}_R$. At a next step 52, the processor 12 determines $A_P$ formed by $a_{11}(V)$, $a_{12}(V)$, $a_{21}(V)$ and $a_{22}(V)$ by using the sensed vehicle speed V and the values of the vehicle parameters of the controlled vehicle.

At a next step 53, the processor 12 determines $A_P \cdot X_P$ by using the following equation.

$$A_p \cdot X_p = \begin{pmatrix} a_{11}(V) & a_{12}(V) \\ a_{21}(V) & a_{22}(V) \end{pmatrix} \begin{pmatrix} \dot{\phi} \\ V_y \end{pmatrix} \tag{16}$$

$$= \begin{pmatrix} a_{11}(V) \cdot \dot{\phi} + a_{12}(V) \cdot V_y \\ a_{21}(V) \cdot \dot{\phi} + a_{22}(V) \cdot V_y \end{pmatrix}$$

For the yaw rate $\dot{\phi}$ and side speed $V_y$, the processor 12 uses initial values ($\dot{\phi}=0$ and $V_y=0$) in the first execution cycle, and uses the estimated values in the following cycles.

At a step 54, the processor 12 determines $\dot{X}_P$ ($=[\dot{\phi} \dot{V}_y]^T$) by substituting $A_P \cdot X_P$, $B_P \cdot \delta_R$ and $B_{PF} \cdot \theta_s$ into a equation (9). At a step 55, the processor 12 determines estimated value of $X_p(=[\dot{\phi}V_y]^T)$ by integrating $\dot{X}_p$ according to the following equation.

$$X_p = \int \dot{X}_p dt = \int \begin{pmatrix} \dot{\phi} \\ \dot{V}_y \end{pmatrix} dt \tag{17}$$

At a final step 56 of the subprogram, the processor 12 determines $D^*$ by using equation (10).

The processor 12 of the second embodiment controls the rear wheel steer angle by repeating the program of FIG. 4 as in the first embodiment. In the second embodiment, however, the processor 12 reads only the steering wheel angle $\theta_s$ and the vehicle speed V at the step 31, and executes the subprogram of FIG. 7 in place of the step 33. The results obtained by the computer simulation of the control system of the second embodiment are almost the same as the results shown in FIGS. 5B–5E.

Like the first embodiment, the control system of the second embodiment can provide the controlled vehicle with a steering response which is more stable and convergent than that of a conventional vehicle and can provide an accurate and precise control by decreasing the control cycle. Furthermore, the second embodiment removes the necessity for the costly yaw rate sensor, side speed sensor and lateral acceleration sensor so that the manufacturing cost is reduced.

Figure 8:
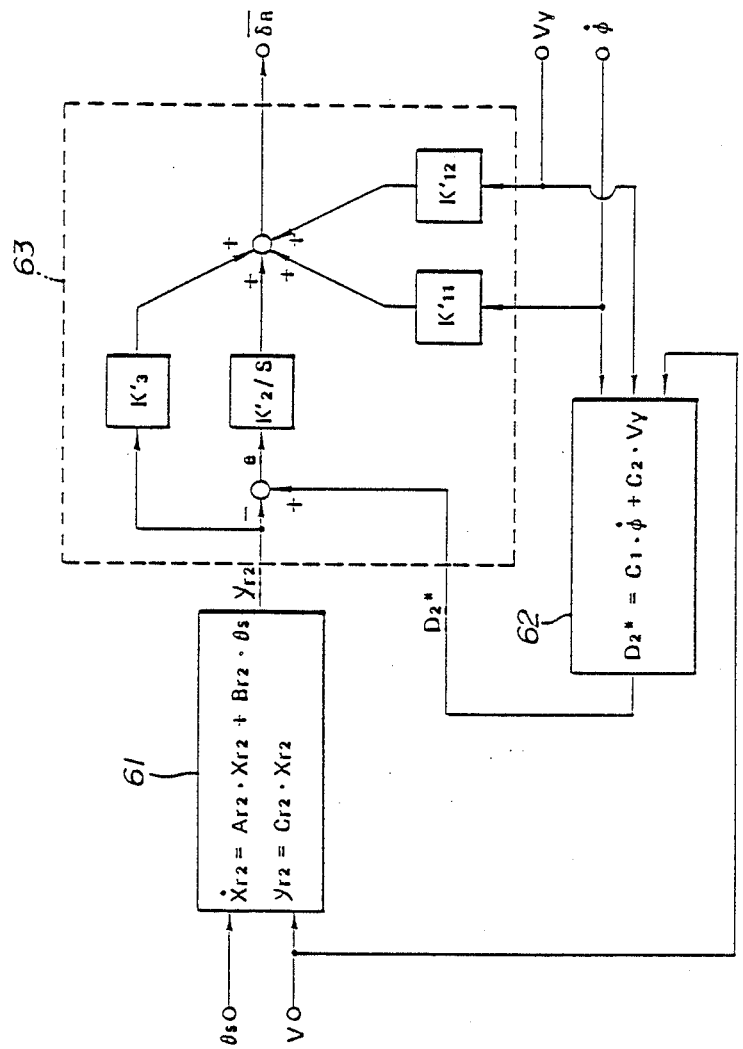
FIG. 8 is a block diagram showing functions of the processor of a third embodiment of the present invention.

A third embodiment of the present invention is shown in FIG. 8.

The lateral acceleration sensor 11 is not used in the third embodiment. However, the control system of the third embodiment includes the yaw rate sensor 9 and side speed sensor 10 as well as the steering wheel angle sensor 7 and vehicle speed sensor 8, which are all connected to the processor 12 as shown in FIG. 2. The control system of the third embodiment is arranged to determine $D^*$ from the sensed yaw rate $\dot{\phi}$ and the sensed side speed $V_y$ whereas, in the first embodiment, the sensed yaw rate and lateral acceleration are used.

As shown in FIG. 8, the processor 12 of the third embodiment performs functions of first section 61, second section 62 and third section 63. The first section 61 corresponds to the first section 21 of the preceding embodiments, and serves as the reference behavior determining means 102. The second section 62 serves as the vehicle behavior monitoring means 103, and the third section 63 serves as the controller means 104.

The first section 61 determines a desired value $y_{r2}$ by using a reference mathematical model composed of the following equations.

$$\dot{X}_{r2} = A_{R2} \cdot X_{r2} + B_{R2} \cdot \theta_s \tag{18}$$

$$y_{r2} = C_{r2} \cdot X_{r2} \tag{19}$$

The second section 62 determines the plant value $D_2^*$ from the sensed yaw rate $\dot{\phi}$ and the sensed side speed $V_y$ by using the following equation (20).

$$D_2^* = C_{PD2} \cdot X_p \tag{20}$$

(where, $$(C_{PD2} = [C_1 C_2], X_p = [\dot{\phi} V_y]^T)$$

In this equation, $C_1$ is a weight factor of the yaw rate $\dot{\phi}$ and $C_2$ is a weight factor of the side speed $V_y$. The weight factors $C_1$ and $C_2$ are determined as constants or as functions of the vehicle speed in the same manner as the weight factor D of the first embodiment.

The third section 63 determines the error e from the desired value $y_{r2}$ and the plant value $D_2^*$ by using the following equation (21).

$$e = D_2^* - y_{r2} \tag{21}$$

In the same manner as the optimum control gains $K_{11}$, $K_{12}$, $K_2$ and $K_3$ of the first embodiment, optimum control gains $K_{11}'$, $K_{12}'$, $K_2'$ and $K_3'$ are preliminarily determined by using the following state equation (23) derived from equations (9), (20) and (21) and the optimum control gains are stored in the form of a data table.

$$\frac{d}{dt} \begin{pmatrix} \dot{X}_p \\ e \\ \dot{X}_{r2} \end{pmatrix} = \begin{pmatrix} A_p & 0 & 0 \\ C_{PD2} & 0 & -C_{r2} \\ O & 0 & A_{r2} \end{pmatrix} \begin{pmatrix} \dot{X}_p \\ e \\ \dot{X}_{r2} \end{pmatrix} + \begin{pmatrix} B_p \\ O \\ O \end{pmatrix} \dot{\delta}_R \tag{23}$$

The third section 63 obtains values of these optimum control gains corresponding to the current value of V from the data table and calculates the target rear wheel steer angle value by using the following equation (24):

$$\overline{\delta}_R = K_1' \cdot X_p + K_2 \int_0^t e \, dt + K_3' \cdot X_{r2} \tag{24}$$

where $$K_1' = [K_{11}' K_{12}'].$$

The control system of the third embodiment enables accurate and precise steer angle control having a short cycle as in the first and second embodiments. Furthermore, the control system of the third embodiment absorbs variations of the actual vehicle parameters with the output feedback using the sensed actual vehicle motion variables and eliminates the necessity of the costly lateral acceleration sensor.

In the present invention, an analog computing circuitry may be used as the processor 12 instead of a microcomputer. Furthermore, the control system of the present invention may be arranged to control both of the front wheel steer angle and the rear wheel steer angle.

What is claimed is:

1. A steer angle control system for a controlled vehicle having at least one steerable first wheel, comprising:
   sensor means for sensing conditions of said controlled vehicle, said sensor means comprising means for sensing a steering wheel angle of said controlled vehicle and providing a sensed steering wheel angle, and means for sensing a vehicle speed of said controlled vehicle and providing a sensed vehicle speed,
   reference behavior determining means, connected with said steering wheel angle sensing means and said vehicle speed sensing means, for determining a value of a reference output motion variable of a predetermined reference mathematical model, corresponding to said sensed steering wheel angle and said sensed vehicle speed by solving said reference model,
   vehicle behavior monitoring means for determining a value of a plant output motion variable which is a linear combination of a yawing motion variable of said controlled vehicle and a side motion variable of said controlled vehicle,
   controller means, connected with said reference behavior determining means and said vehicle behavior monitoring means, for producing a control signal representing a target first wheel steer angle so as to reduce a deviation of said plant output motion variable from said reference output motion variable, and
   actuator means for varying an actual first wheel steer angle of said controlled vehicle in accordance with said control signal.

2. A steer angle control system according to claim 1 wherein said vehicle behavior monitoring means is connected with said sensor means for determining approximate values of said yawing motion variable and side motion variable of said controlled vehicle from at least one output signal of said sensor means.

3. A steer angle control system according to claim 2 wherein said vehicle behavior monitoring means includes means for determining said plant output motion variable which is a sum of a first product obtained by multiplying said yawing motion variable by a first weight factor and a second product obtained by multiplying said side motion variable by a second weight factor.

4. A steer angle control system according to claim 3 wherein said vehicle behavior monitoring means is connected with said vehicle speed sensing means, and each of said first and second weight factors is a function of said sensed vehicle speed.

5. A steer angle control system according to claim 3 wherein said sensor means further comprises means for sensing said yawing motion variable of said controlled vehicle and comprises means for sensing said side motion variable of said controlled vehicle, and said vehicle behavior monitoring means is connected with said yawing motion variable sensing means and said side motion variable sensing means.

6. A steer angle control system according to claim 5 wherein said yawing motion variable sensing means comprises a yaw rate sensor for sensing an actual yaw rate of said controlled vehicle and providing a sensed yaw rate which is supplied to said vehicle behavior monitoring means as said yawing motion variable.

7. A steer angle control system according to claim 6 wherein said side motion variable sensing means comprises a lateral acceleration sensor for sensing an actual lateral acceleration of said contolled vehicle and providing a sensed lateral acceleration which is supplied to said vehicle behavior monitoring means as said side motion variable.

8. A steer angle control system according to claim 6 wherein said side motion variable sensing means comprises a side speed sensor for sensing an actual side speed of said controlled vehicle and providing a sensed side speed which is supplied to said vehicle behavior monitoring means as said side motion variable.

9. A steer angle control system according to claim 6 wherein said controller means comprises main means for determining said deviation of said plant output motion variable from said reference output motion variable and determining a basic first steer angle value from said deviation according to an integral control law using a predetermined integral gain.

10. A steer angle control system according to claim 9 wherein said side motion variable sensing means comprises a side speed sensor for sensing an actual side speed of said controlled vehicle and providing a sensed side speed, and said controller means further comprises first compensating means connected with said yaw rate sensor for determining a first compensation value by multiplying said sensed yaw rate by a first gain, second compensating means connected with said side speed sensor for determining a second compensation value by multiplying said sensed side speed by a second gain, third compensating means connected with said reference determining means for determining a third compensation value by multiplying said reference output motion variable by a third gain, and summer means for determining said target first wheel steer angle by adding said first, second and third compensation values to said basic value.

11. A steer angle control system according to claim 10 wherein said controller means further comprises fourth compensating means connected with said steering wheel sensing means for determining a fourth compensation value by multiplying said sensed steering wheel angle by a fourth gain, and said summer means is connected with said main means and said first, second, third and fourth compensating means for determining said target first wheel steer angle by adding said first, second, third and fourth compensation values to said basic first wheel steer angle value.

12. A steer angle control system according to claim 11 wherein said controller means is connected with said vehicle speed sensing means, and each of said integral gain and said first, second and third gains is a function of said sensed vehicle speed.

13. A steer angle control system according to claim 10 wherein said side motion variable sensing means further comprises a lateral acceleration sensor for sensing an actual lateral acceleration of said controlled vehicle and providing a sensed lateral acceleration which is supplied to said vehicle behavior monitoring means as said side motion variable.

14. A steer angle control system according to claim 10 wherein said side speed sensor is connected with said vehicle behavior monitoring means for supplying said sensed side speed as said side motion variable.

15. A steer angle control system according to claim 3 wherein said vehicle behavior monitoring means is connected with said steering wheel angle sensing means, said vehicle speed sensing means and said controller means for receiving said sensed steering wheel angle and vehicle speed, and said target first wheel steer angle, and estimating said yawing motion variable and said side motion variable from said sensed steering wheel angle and vehicle speed and said target first wheel steer angle by using a predetermined mathematical plant model representing said controlled vehicle.

16. A steer angle control system according to claim 15 wherein said vehicle behavior monitoring means comprises means for estimating actual yaw rate and side speed of said controlled vehicle and determining estimated yaw rate and side speed, and said controller means comprises main means for determining a basic first wheel steer angle value from said deviation according to an integral control action, first compensating means connected with said estimating means for determining a first compensation value by multiplying said estimated yaw rate by a first gain, second compensating means connected with said estimating means for determining a second compensation value by multiplying said estimated side speed by a second gain, and summer means for determining said target first wheel steer angle by adding said first and second compensation values to said basic value.

* * * * *